United States Patent [19]

Takeuchi

[11] Patent Number: 5,068,731
[45] Date of Patent: Nov. 26, 1991

[54] VIDEO IMAGE ENLARGEMENT AND REDUCTION SYSTEM AND METHOD

[75] Inventor: Kesatoshi Takeuchi, Suwa, Japan

[73] Assignee: Seiko Epson Corporation, Japan

[21] Appl. No.: 465,247

[22] PCT Filed: Jul. 3, 1989

[86] PCT No.: PCT/JP89/00665
§ 371 Date: Apr. 30, 1990
§ 102(e) Date: Apr. 30, 1990

[87] PCT Pub. No.: WO90/00789
PCT Pub. Date: Jan. 25, 1990

[30] Foreign Application Priority Data
Jul. 14, 1988 [JP] Japan ................ 63-176037

[51] Int. Cl.⁵ .............. H04N 3/223; H04N 7/01; H04N 5/04
[52] U.S. Cl. .................. 358/180; 358/140; 358/148; 382/47
[58] Field of Search ......... 358/180, 140, 148, 158, 358/149; 382/47

[56] References Cited
U.S. PATENT DOCUMENTS

| | | | |
|---|---|---|---|
| 4,227,214 | 10/1980 | Morito et al. | 358/158 |
| 4,556,905 | 12/1985 | Ikejiri | 358/158 |
| 4,610,026 | 9/1986 | Tabata et al. | 358/180 |
| 4,651,209 | 3/1987 | Okada et al. | 358/158 |
| 4,701,800 | 10/1987 | Akimoto et al. | 358/140 |
| 4,791,488 | 12/1988 | Fukazawa et al. | 358/158 |
| 4,843,471 | 6/1989 | Yazawa et al. | 358/160 |

*Primary Examiner*—James J. Groody
*Assistant Examiner*—Glenton B. Burgess
*Attorney, Agent, or Firm*—W. Douglas Carothers, Jr.; Richard B. Main

[57] ABSTRACT

A video processing circuit which includes a video memory and is capable of arbitrarily enlarging or reducing a video signal in the vertical direction of the displayed image. A vertical sync signal in the video signal and a signal from the VCO in a PLL circuit, which is divided into 1/N by vertical sampling line value, N, are both supplied to the inputs of phase comparator of PLL circuit. A signal whose frequency is N times the frequency of vertical sync signal is then produced and this signal is utilized as a vertical address signal for the video memory.

10 Claims, 2 Drawing Sheets

VIDEO IMAGE ENLARGEMENT AND REDUCTION SYSTEM AND METHOD

BACKGROUND OF THE INVENTION

This invention relates generally to a video processing circuit which enlarges or reduces video image in the vertical direction and, in particular, to a vertical address control at the time of writing into or reading from a video memory.

FIG. 4 is a block diagram of a video processing circuit of the prior art which enlarges or reduces video image. In the figure, 31 is a signal divider for dividing horizontal sync signal, HS, 32 is a vertical address counter, and 33 is a video memory.

Video memory 33 specifies a horizontal sync signal, HS, which forms one visual image by vertical address, and specifies each dot which is converted from analog to digital at a certain specified number of dots for each horizontal sync signal, for example 960 dots, by horizontal address.

In the case of displaying enlarged or reduced video image responding to the luminance signal stored in video memory 33, signal divider 31 divides horizontal sync signal, HS, into $\frac{1}{N}$ and supplies the divided signal to vertical address counter 32, which controls vertical address of video memory 33, as a count up signal. Vertical address counter 32 is counted by a divided signal, and the counted value becomes the address for the vertical direction.

There is a problem, however, with the video processing circuit of the prior art in that arbitrary enlargement or reduction is absolutely impossible because in the case of writing a luminance signal into a vertical address of video memory 33 which is specified by vertical address counter 32, the reduction is only by $\frac{1}{N}$ and in the case of reading a luminance signal from video memory 33, the reduction is also only by $\frac{1}{N}$.

This invention solves the foregoing problem with an objective to provide a video processing circuit which is capable of arbitrary and easy enlargement and reduction of the video signal and the resultant video image.

SUMMARY OF THE INVENTION

The video processing circuit in connection with this invention comprises a phase lock loop circuit (referred to hereinafter as PLL circuit) wherein a vertical sync signal of video signal is applied to one of the phase comparative inputs of the circuit, and a signal divider, which receives a VCO signal from the PLL circuit, divides it into 1/N (N is an integer), and supplies this divided signal to the other phase comparative input of the circuit. Then, the VCO signal from the PLL circuit is counted by a vertical address counter, and at the time of access to the video memory this value is employed as a vertical address.

Also, a vertical address memory is placed between a vertical address counter and a video memory. This vertical address memory synchronously stores the counted value of the vertical address counter in the input of horizontal sync signal and supplies the stored value to the video memory as a vertical address.

Also, another memory which stores the dividing ratio, N, is placed in a signal divider, and it is constructed so that inside the memory can be addressed by separately connected CPU, personal computer, or the like.

Thus, according to this invention, since the clock frequency of a video memory can be adjusted by employing a PLL circuit, very stable properties are inexpensively obtained. Also, since it is not affected by the frequency of multiple video signals, it can respond to various types of multiple video signals.

Further, enlargement and reduction of video image can be easily ascertained or adjusted by separately connected CPU, personal computer, or the like, making it extremely beneficial in the future field of digital video.

Still further, since a video memory can be easily put into practical use, such as a video digitizer for writing in and a video display panel and the like for read from, this invention is indispensable for a video processing circuit, such as video personal computers, intelligent peripherals, and the like which will become increasingly popular in use in the future.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Embodiments of this invention will be described in details relative to the attached drawings.

Figure 1:
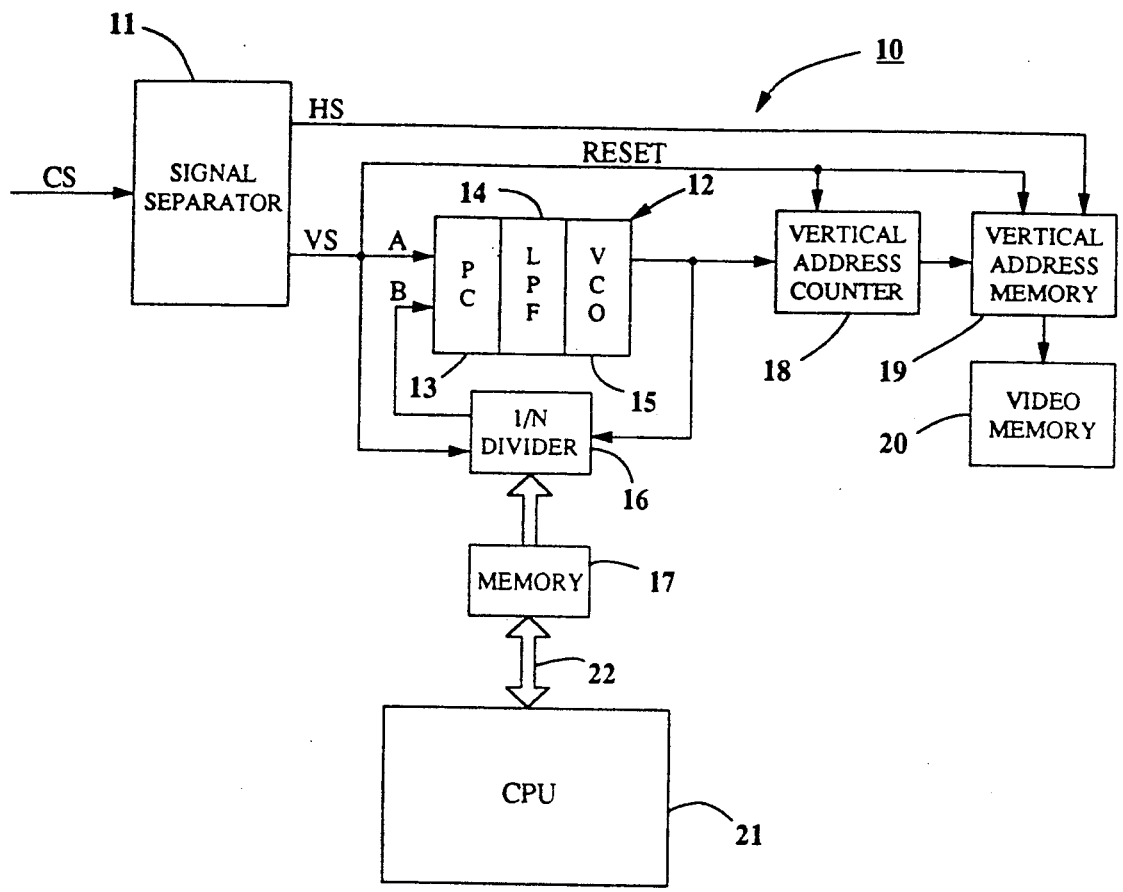
FIG. 1 is a block circuit diagram of a video processing circuit of this invention.
Figure 4:
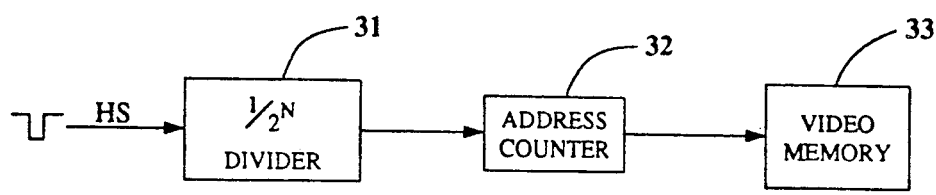
FIG. 4 is a block diagram of a video processing circuit of the prior art.

FIG. 1 is a block circuit diagram of a video processing circuit comprising an embodiment of this invention. In FIG. 1, 11 is a sync signal separator which separates multiple video signals into vertical sync signal, VS, and horizontal sync signal, HS. 12 is a PLL circuit having phase comparator 13, low pass filter 14, and VCO 15. 16 is a signal divider. 17 is a memory. 18 is a vertical address counter. 19 is a vertical address memory. 20 is a video memory. 21 is a separately connected CPU or a personal computer (referred to hereinafter simply as CPU), and 22 is a CPU bus.

Next, the operation of a video processing circuit comprised of the above structure will be described. In the case here, it will be assumed that a certain value, for example, A, is stored in memory 17 via CPU bus 22 from CPU 21.

First, multiple video signals are applied to sync signal separator 11, and the vertical sync signal, VS, which was separated from the signal enters into phase comparative input A of PLL circuit 12. Also, at this time, vertical sync signal, VS, resets vertical address counter 18 and vertical address memory 19 of video memory 20 and further addresses signal divider 16 to read the value, A, stored in memory 17. Next, the clock signal, CK, which is supplied from VCO 15, which is placed inside PLL circuit 12, addresses vertical address counter 18 count regardless of horizontal sync signal, HS, which was separated by sync signal separator 11. Also, signal divider 16 counts up to the value, A, every time clock signal, CK, is applied. When signal divider 16 reaches the value, A, a carrier signal is generated from signal divider 16 and transmitted to phase comparative input B of PLL circuit 12.

At this time, phase comparator 13 determines the phase difference between phase comparative input A and phase comparative input B, and the difference is transferred to low pass filter 14 and voltage conversion is performed. The clock frequency in VCO 15 varies according to the converted voltage from low pass filter 14. This process is continuously repeated until a locked state is achieved wherein the phase difference between phase comparative input A and phase comparative input B is negligible.

Next, read from and write in functions relative to video memory 20 are performed during the vertical sync period obtained in this locked state or condition according to the value, A, i.e., the amount of vertical resolution data as stored in memory 17.

It is also possible to use signal divider 16 simply as an up counter and employ its signal which is obtained when the value from memory 17 corresponds as a carrier signal from signal divider 16.

Figure 2:
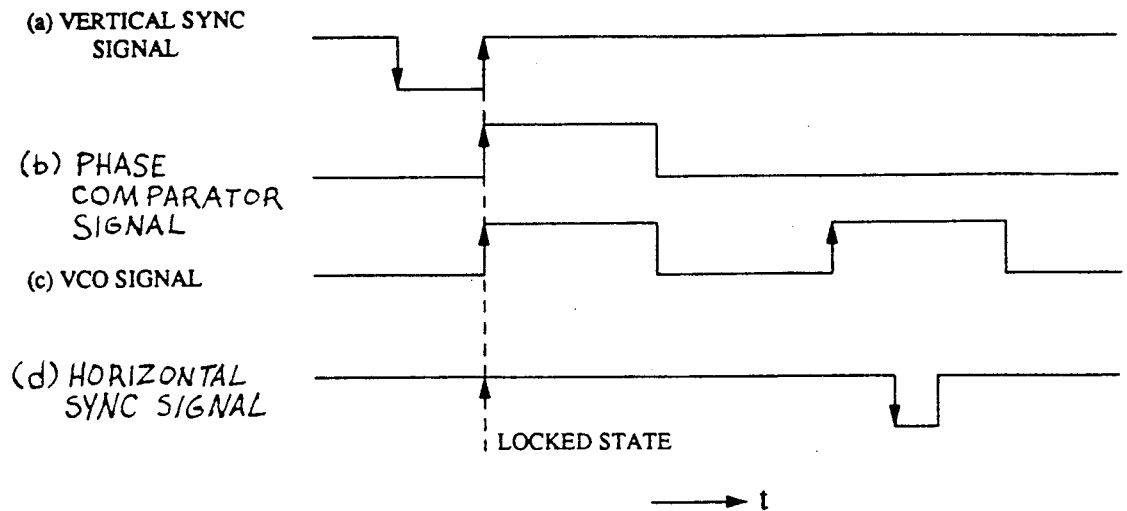
FIG. 2 is a timing diagram illustrating the operation of the video processing circuit in FIG. 1.

FIG. 2 is a time diagram illustrating the operation at the time of access to video memory 20 after PLL circuit 12 arrives in its locked state, and this operation is now described employing this time diagram.

First, signal divider 16 and vertical address counter 18 are reset by the falling edge of a vertical sync signal, VS, and vertical sync signal, VS, is applied to phase comparative input A of PLL circuit 12 at the timing of its rising edge. Also, phase comparative signal, PC, which is the result of signal divider 16 dividing the VCO signal from VCO 15, is transmitted to phase comparative input B of PLL circuit 12. The state wherein input of rising edge of vertical sync signal, VS, and rising edge of phase comparative signal, PC, is being performed illustrates that the locked state of PLL circuit is being performed.

Then, vertical address counter 18 is counted up asynchronously with horizontal sync signal, HS, by the rising edge of the VCO signal. However, vertical address counter 18 only counts up in this state, and the counted value of vertical address counter 18 is stored in vertical address memory 19 at the falling edge of horizontal sync signal, HS. Then, write in or read from video data in video memory 20 is performed based on this stored vertical address.

The timing of the rising edge or falling edge of each signal in FIG. 2 is just one example, and the operation of the circuit is not limited to this example, and it goes without saying that the timing naturally varies appropriately depending upon the properties of the components employed in the circuit.

It should be noted that the spatial period for vertical reduction of the video signal content at the time of access to video memory 20 can be adjusted by an arbitrary amount because the output frequency of PLL circuit 12, i.e., the frequency of the VCO signal changes by changing the value A of memory 17. Therefore, the counted value of vertical address counter 18 also changes. Because of this, vertical enlargement or reduction of video signal can be arbitrarily performed.

Figure 3A:
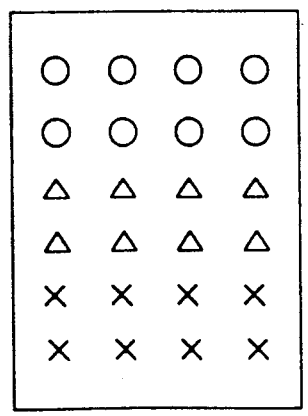
FIGS. 3A and 3B are pictorial illustrations to illustrate the relationship between the video memory and the video image.

FIG. 3 is a pictorial illustration of the foregoing operation, and FIG. 3A is an illustration of the content of the video data in video memory 20.

For example, when the frequency of VCO signal is set so that it is twice the horizontal sync signal, HS, then alternate video data in vertical direction in memory 20 in FIG. 3A is read. Therefore, the video data which is extenuated vertically by alternate horizontal lines is achieved as illustrated in FIG. 3B, thereby achieving a video image which is reduced in the vertical direction by one half of the original video signal.

Also, in order to obtain the video image which is enlarged to twice in size, if the frequency of VCO signal is set to be ½ of horizontal sync signal, HS, then identical vertical data is obtained in alternate adjacent horizontal lines, thereby achieving a video image enlarged in the vertical direction by twice the original video signal. In this case, opposite to the previous case for signal reduction, the content of video data signal of video memory 20 is illustrated in FIG. 3B, and FIG. 3A is the video signal which is read from memory 20.

Figure 3B:
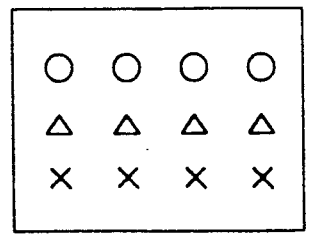

Also, FIG. 3B is the case wherein the content of the video signal is shown, and in the case of writing video image which is reduced to ½ in vertical direction into video memory 20, the frequency of the VCO signal is set so that it is twice the horizontal sync signal, HS. By reading the video signal in alternate vertical address, vertical video data is extenuated, and the image is reduced vertically to ½. Thus, the video data as illustrated in FIG. 3A is written into video memory 20.

The frequency of VCO signal, which sets the degree of vertical resolution of the video signal, can be set arbitrarily depending upon the value, A, stored in memory 17. Therefore, vertical enlargement and reduction of video image may be easily performed.

This invention can be adapted as a video digitizer for writing in, and as a video display panel for read from so that this invention is indispensable in a video processing circuit, such as a video display in personal computers, intelligent peripherals, and the like, which will be increasingly popular in the future.

While the invention has been described in conjunction with several specific embodiments, it is evident to those skilled in the art that many further alternatives, modifications and variations will be apparent in light of the forgoing description. Thus, the invention described herein is intended to embrace at such alternatives, modifications, applications and variations as fall within the spirit and scope of the appended claims.

What is claimed is:

1. A video sweep synchronizing and address system having inputs to receive horizontal and vertical sweep synchronizing signals associated with a video signal, the system comprising:

a phase locked loop having a two-input phase comparator that controls a voltage controlled oscillator, a first input to the phase comparator connected to the vertical sweep input of the system;

a digital divider receiving at its input a first signal from the output of voltage controlled oscillator, the output of the digital divider connected to a second input to the phase comparator, the digital divider able to divide by an integer quantity "n";

a vertical address counter receiving at its input a second signal from the output of voltage controlled oscillator;

a vertical sweep circuit such that the vertical dimension of an image can be controlled by adjusting the integer quantity "n";

a vertical address memory that receives a count value from the vertical address counter and is connected to the horizontal sweep input of the system such that count values are stored in synchronism with the horizontal sweep input the vertical address memory having means to output a vertical address value for use by the vertical sweep circuit; and a video memory connected to receive data from the vertical address memory.

2. The system of claim 1, further comprising:
a memory for storing the integer value "n" in communication with the digital divider.

3. The system of claim 2, wherein:
said integer value "n" is accessible to and can be manipulated by a computer.

4. The system of claim 1, further comprising:
means for adjusting said integer value "n" by a user.

5. A video image enlargement and reduction system, comprising:

A phase lock loop (PLL) having a phase comparator that drives a low pass filter (LPF) which, in turn, controls a voltage-controlled oscillator (VCO), the phase comparator able to accept and compare a first vertical sync signal and a second vertical sync signal, the VCO able to output a third vertical sync signal;

a divide-by-"n" digital divider that inputs and divides by an integer value "n" the third vertical sync signal by an integer amount and then outputs the result as the second vertical sync signal which is then applied to the phase comparator, the digital divider able to load a new integer value "n" in synchronism with the first vertical sync signal; and a vertical address counter (VAC) responsive to the first and third vertical sync signals, the VAC able to output a digital vertical address count value that is derived from the first and third vertical sync signals.

6. The system of claim 5, further comprising:
sync signal separator means for extracting the first vertical sync signal and a horizontal sync signal from a composite signal, the first vertical sync signal supplied to the phase comparator.

7. The system of claim 6, further comprising:
a vertical address memory (VAM) having an input for the horizontal sync signal, an input for the first vertical sync signal, and an input for the vertical address count, the VAM able to periodically store the digital value of the vertical address count in response to the horizontal sync signal, the stored value able to then direct a plurality of video data to particular addresses within the video memory.

8. The system of claim 7, wherein:
the first vertical sync signal periodically and simultaneously resets the divide-by-"n" digital divider, the vertical address counter, and the vertical address memory.

9. The system of claim 5, further comprising:
a computer system in communication with the divide-by-"n" digital divider and able to periodically supply the new integer value "n".

10. A method of video image enlargement and reduction by a scaling factor in video system that uses vertical and horizontal raster sweep coordinated by horizontal and vertical sync signals, the method comprising the steps of:

synthesizing a modified vertical sync signal by using a phase lock loop (PLL) circuit with a programmable divider in the feedback loop to lock an oscillator to the vertical sync signal;

loading an integer value input by a user such that the denominator used by the programmable divider is substituted thereby, the integer value proportionate to the scaling factor;

counter alternations of the output signal of the oscillator with a vertical address counter to arrive at a count value;

storing said count value in a vertical address memory in synchronism with a horizontal sweep input signal; and indexing and accessing vertical addresses in video memory with said stored count values.

* * * * *